(12) United States Patent
Chapman et al.

(10) Patent No.: US 6,922,390 B1
(45) Date of Patent: Jul. 26, 2005

(54) METHOD AND APPARATUS FOR FORECASTING AND CONTROLLING CONGESTION IN A DATA TRANSPORT NETWORK

(75) Inventors: Alan S. Chapman, Kanata (CA); Hsiang T. Kung, Lexington, MA (US)

(73) Assignee: Nortel Networks Limited, St. Laurent, Quebec ( * ) Notice: Subject to any disclaimer, the term of this patent is extended or adjusted under 35 U.S.C. 154(b) by 660 days.

(21) Appl. No.: 09/333,269

(22) Filed: Jun. 15, 1999

(51) Int. Cl.[7] ............... G06F 11/00; G08C 15/00; H04J 1/16; H04J 3/14; H04J 1/00

(52) U.S. Cl. ............... 370/229; 370/230; 370/231; 370/232; 370/233; 370/234; 370/235; 370/235.1

(58) Field of Search ............... 370/230, 231, 370/232, 233, 234, 235, 235.1, 236, 236.1, 236.2, 229

(56) References Cited

U.S. PATENT DOCUMENTS

| | | | | |
|---|---|---|---|---|
| 5,457,687 A | * | 10/1995 | Newman | 370/232 |
| 5,701,292 A | * | 12/1997 | Chiussi et al. | 370/232 |
| 5,737,313 A | * | 4/1998 | Kolarov et al. | 370/234 |
| 5,777,984 A | * | 7/1998 | Gun et al. | 370/230 |
| 5,805,577 A | * | 9/1998 | Jain et al. | 370/234 |

FOREIGN PATENT DOCUMENTS

| | | |
|---|---|---|
| EP | 0596159 | 5/1994 |
| EP | 0712220 | 5/1996 |

OTHER PUBLICATIONS

Pazos C M et al.: "Using Back–PressureTo Improve TCP Performance with many flows", Proceedings IEEE Infocom, The Conference On Computer Communications, US, New York, NY IEEE, Mar. 21 1999 pp. 431–438.

Chang K: IP Layer Per–flow Queueing and Credit Flow Control: PH.D Dissertation, 'Online! Jan. 1998, pp. 18–28, Harvard University from Internet: url:http;//www.eecs.harvard.edu/(chang/papers/thesis.ps> 'retrieved on Aug. 17, 2000.

Chen M –S et al.: "Hop–By–Hop Flow Control On Unreliable Connections" International Conference on Communications, US, New York, IEEE, Jul. 7, 1987, pp. 1683–1687.

Ozveren C M et al: "Reliable and Efficient Hop–By–Hop Flow Control" IEEE Journal on Selected Areas in Communications, US, IEEE, Inc., New York, No. 4, May 13, 1995 pp. 642–650.

* cited by examiner

*Primary Examiner*—Wellington Chin
*Assistant Examiner*—Chuong Ho (57) ABSTRACT

A method and apparatus for controlling congestion at a node in a data network. The node includes an input for receiving traffic units from the network, an output for releasing traffic units to the network and a control unit. The control unit is responsible for estimating a level of data occupancy of at least a portion of the network by looking at the traffic units received at the input from a remote node in the network. When the data occupancy level reaches a certain threshold, the node issues a control signal to the remote node such that the remote node lowers its rate of traffic units input in the network. By estimating the network data occupancy level, congestion at the node can be effectively foreseen and controlled.

24 Claims, 5 Drawing Sheets

Figure 4 a) Non-congested b) Congested

Figure 5

METHOD AND APPARATUS FOR FORECASTING AND CONTROLLING CONGESTION IN A DATA TRANSPORT NETWORK

FIELD OF THE INVENTION

The present invention relates to the field of digital data transmission. More specifically, it pertains to a method and apparatus for forecasting and controlling congestion within a data transport network, such as a standard routed network or an add/drop packet network.

BACKGROUND OF THE INVENTION

Within a data transport network, it is desirable that bandwidth sharing between the network trunks be well managed so as to avoid congestion. In the simplest form, this means that trunks sharing a section of the physical transport medium should all be able to get a reasonable share of the bandwidth at that point.

Prior art mechanisms for avoiding congestion within a data network include a centralized management scheme or a complex system for interchange of information implemented within the transport network. One such system for interchange of information is equivalent to the bidding for space on the common transport medium by the various network nodes, where the bidding performed by a particular node is based on the amount of data traffic at that particular node. The amount of data traffic may be evaluated on the basis of queue length at the particular node. Unfortunately, such schemes do not cater to the fact that the data sources (nodes) are themselves adaptive and that queue lengths at the inputs to the transport medium are not an indication of potential demand. This reduces the effectiveness and accurateness of these congestion mechanisms, such that congestion may still exist within the transport network.

Within a standard routed network, it is typical for a router to buffer all of its through traffic along with its local traffic. Buffer fill triggers packet loss, which in turn signals data sources to slow down. Another existing mechanism for implementing congestion control involves the monitoring of the average buffer fill such that discard may be effected before the buffer overflows. Unfortunately, such data buffering causes important latency within the network, as well as high-speed storage costs and loss of data at the router.

The background information herein clearly shows that there exists a need in the industry to provide an improved mechanism for controlling congestion within a data network.

SUMMARY OF THE INVENTION

The present invention also encompasses a method for controlling the congestion at a node in a data network. The method comprises the steps of estimating a data occupancy level of at least a portion of the data network based at least on a rate of traffic units passing through the node, and taking an appropriate action in an attempt to reduce congestion (if congestion exists).

In a specific example, the node evaluates the data occupancy level of a certain portion of the network and compares it against a threshold. This threshold is dynamic and varies on the basis of the rate of release from that node of traffic units input in the node from a local source. When the threshold is exceeded, the node issues a control signal that is sent to the remote node. The control signal is a congestion stamp placed into a certain traffic unit before its release from the node into the network. The control signal is a notification to the remote node to reduce the output of traffic units into the network.

The traffic units in the data network may be either user data packets, control packets or compound packets having a user data part and a control part. The user data packets and the user data parts of the compound packets carry mostly user payload data, such as speech samples, video samples or other. The control packets and control parts of the compound packets carry control information, such as source and destination identifiers, control sequence numbers and reverse direction acknowledgements. In a specific example, the traffic units used to evaluate the data occupancy level within the network are control packets.

The present invention also encompasses a method for controlling the congestion at a node in a data network. The method comprises the steps of estimating a data occupancy level of at least a portion of the data network based at least on a rate of traffic units passing through the node, and taking an appropriate action in an attempt to reduce congestion (if congestion exists).

Other aspects and features of the present invention will become apparent to those ordinarily skilled in the art upon review of the following description of specific embodiments of the invention in conjunction with the accompanying figures.

DETAILED DESCRIPTION

Figure 1:
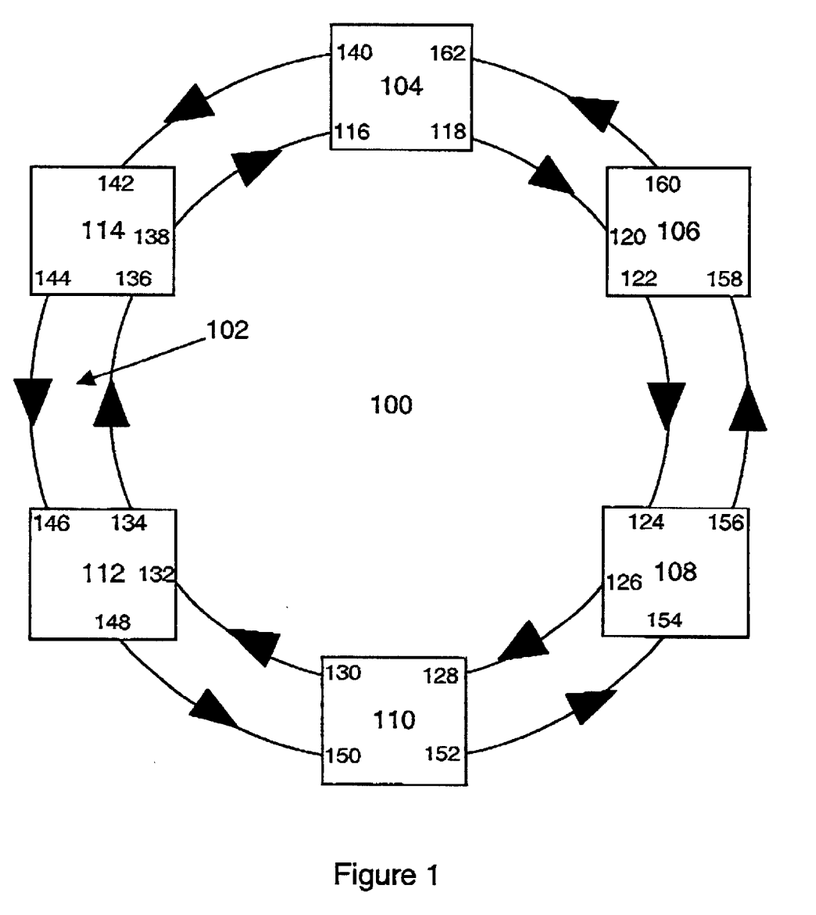
FIG. 1 is a block diagram of an example of a ring-based data transport network.

In a specific example the present invention is implemented in a data transport network featuring a ring-based transport medium. FIG. 1 illustrates a typical ring-based transport network 100, where the transport ring 102 interconnects a plurality of nodes 104, 106, 108, 110, 112 and 114. Each node includes an input/output pair corresponding to one direction of the ring 102, where the input is for receiving traffic units from the ring 102 and the output is for releasing traffic units to the ring 102. Each connection between an output of one node and an input node of another, remote node is defined as a trunk. Note that the endpoints of such a trunk may be referred to as sender (originator of the data being sent over the trunk) and receiver (destination of the data being sent over the trunk). For example, the connection between output 118 of node 104 (sender) and input 132 of node 112 (receiver) is a trunk A, while the connection between output 156 of node 108 (sender) and input 142 of node 114 (receiver) is a trunk B. Since the transport ring 102 is a medium that is common to all of the nodes, the trunks formed between these nodes must share the total bandwidth available over the transport ring 102.

Figure 2:
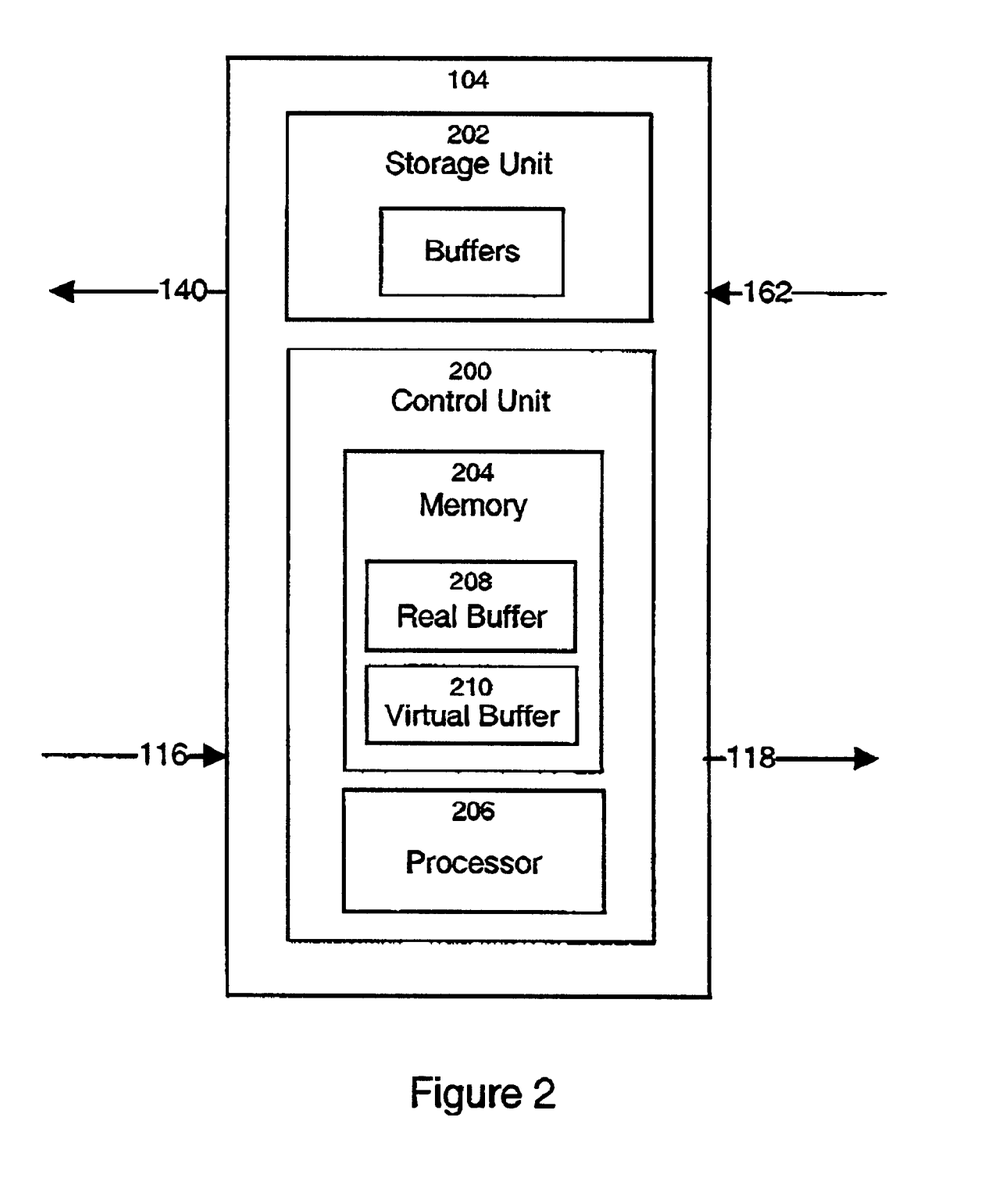
FIG. 2 is a block diagram of a transport node shown in FIG. 1, in accordance with an embodiment of the present invention.

As shown in FIG. 2, each of the transport ring 102 nodes generally includes a control unit 200 and a storage unit 202; assume for this example that we are looking at node 104. The control unit 200 includes a memory 204 and a processor 206, and is responsible for controlling the flow of traffic units inserted by the node 104 onto the transport ring 102. Control unit 200 further implements a congestion control mechanism based on the amount of traffic being carried by the transport ring 102, such that congestion at the node is foreseen and avoided or at least reduced, as will be described in further detail below. In this specific example of implementation, the congestion control mechanism is implemented by software executed by the processor 206. The storage unit 202 includes a plurality of buffers (queues) for receiving and storing data arriving at node 104 from local sources, where the traffic from these buffers is to be transported over respective trunks of the transport ring 102. The storage unit 202 is the actual physical storage facility where traffic units are handled. Although the memory 204 is also a physical storage device, it is used primarily for control purposes. This distinction is not critical to the present invention and an embodiment where a single storage medium is provided that combines the memory 204 and the storage unit 202 can clearly be envisaged.

The traffic units in the data network may be either user data packets, control packets or compound packets having a user data part and a control part. The user data packets and the user data parts of the compound packets carry mostly user payload data, such as speech samples, video samples or other. The control packets and control parts of the compound packets carry control information, such as source and destination identifiers, control sequence numbers and reverse direction acknowledgements. Note that in addition to user payload data a user data packet may contain some form of control element, for example an identifier representative of a companion control packet.

The memory 204 of the control unit 200 includes two queues 208 and 210, hereafter referred to as real buffer 208 and virtual buffer 210. The real buffer 208 receives traffic units from the various local buffers of the storage unit 202, and provides a temporary storage mechanism for holding all traffic units for insertion onto the transport ring 102 until space is available on the ring 102. The virtual buffer 210 is used by the control unit 200 to determine whether congestion is or will be experienced by the node 104, and has an effective fill which is equivalent to the amount of space available on the ring 102, or data occupancy level on the ring 102 for receiving traffic from the node 104. The functionality of the virtual buffer 210 will be described in further detail below. The physical configuration of buffers 208 and 210 does not need to be described in detail because such components are readily available in the marketplace and the selection of the appropriate buffer mechanism suitable for use in the present invention is well within the reach of a person skilled in the art. The memory 204 also supports a TCP-like adaptive window for use by the control unit 200, as will be described in further detail below.

The memory 204 further contains a program element that regulates the congestion control mechanism of the node 104. The program element is comprised of individual instructions that are executed by the processor 206, for evaluating the link occupancy of the transport ring 102 and for reducing the likelihood of congestion at the node. This program element will be described in further detail below.

A conventional IP network implements bandwidth sharing among host machines using the Transport Control Protocol (TCP). Although data flow in the network can be bi-directional, it is usual to refer to the originator of a particular piece of data as the sender and the other end as the receiver. In TCP, the sender (sender host machine) constantly tests the network to see if more bandwidth is available and uses the loss of a packet determined by sequence numbers of TCP packets as an indication to decrease its rate. The general characteristic of TCP is that it is self-clocking. That is to say, the sender will wait for an acknowledgement from the receiver for the packets already sent before sending more packets. If the sender waited for each individual packet to be acknowledged then the maximum rate that the connection could achieve would be one packet per round trip time of the connection. To increase the sending rate while keeping the self-clocking nature of the protocol, the sender is allowed to send some number of packets while waiting for an earlier packet to be acknowledged. This number of packets is called the window. The receiver itself may constrain the size of the window in order to limit its buffer requirement.

The current size of the window is called the congestion window and can vary between one packet and the maximum that the receiver is prepared to accept. As the sender receives acknowledgements, the window slides forward and also increases in size. An increase in size allows the connection to run faster. If a packet is not acknowledged it will eventually be considered lost and this loss is assumed to be a result of congestion at some merge point. The sender, in addition to retransmitting the packet, will reduce the window size. The slow and gradual increase in window size then begins again.

An embodiment of the present invention uses a mechanism to implement congestion control at a node within a data transport network, where this mechanism has some common points to the TCP process and is thus referred to as a TCP-like mechanism. Specifically, the mechanism comprises the use of an adaptive window scheme, such as that used in TCP, where the adaptive window scheme controls the real data transmission rates. The data occupancy level of the network is estimated and regularly updated, such that it may be used to adjust the window size.

In a particular example of implementation of the present invention, the data network 100 implements a control overlay concept, whereby data control is detached from the user data itself. Unlike TCP where control information is embedded in the data packets, the control overlay concept separates the control information from the user data. Specifically, for every user data packet sent over the transport ring 102, there is a corresponding control packet sent separately by the data control system, which itself emulates the topology of the data network. Note that this emulation of the data network topology may be effected by using the same physical path of the ring 102 as that used by the data stream. Alternatively, the control packets could use a physical path of the ring 102 that is separate from that used for transporting the actual user data, as long as the control packets travel in reasonable synchronism with the user data packets. Taking for example the trunk between sender 104 and receiver 112, for every user data packet sent by the sender 104 to the receiver 112, the control unit 200 will generate and send a control packet over the ring 102 towards the receiver 112, thus emulating the trunk. Alternatively, the user data packets and control packets may be merged to form a compound packet, where data control is embedded into the actual user data stream, as in the case of TCP. The control packet, in a specific example, is a predefined sequence of bit fields containing, but not limited to: a busy/idle indicator for the ring slot of the corresponding data unit; source (sender) and destination (receiver) node identifiers; control sequence numbers; congestion notification; and reverse direction.

Assume hereinafter that both control packets and user data packets form the body of traffic units transiting through the transport ring 102, data control information being separate from the user data stream itself. Each node in the ring-based transport network independently assesses the data occupancy level in the network and implements a congestion control mechanism in response to this data occupancy level, in particular if the data occupancy level signals the presence of congestion at the particular node. Specific to the present invention, the control unit 200 of node 104 is operative to detect and foresee congestion at the node 104, in response to which it will generate a control signal. In the situation where the node 104 is experiencing congestion, this control signal is effective to reduce the level of congestion. In the situation where the node 104 will be experiencing congestion in the future, this control signal is effective to reduce the likelihood of congestion developing at the node 104.

In a specific example, the control signal generated by the control unit 200 takes the form of a congestion stamp applied to a control packet released from the node 104 to the transport ring 102. Specifically, each control packet has a congestion notification field. As control packets are released in the network, this field is set to a default value "not congested". An intermediate node on the path of the trunk followed by a control packet can apply a congestion stamp to the control packet by setting the bits in the congestion notification field of a control packet to "congested", thus indicating that congestion is being experienced or is being forecasted at the intermediate node.

At the receiving end of the trunk, the receiver will check control packets for this congestion stamp and, if detected, will pass it back to the sender using an outgoing control packet travelling in the reverse direction over the transport ring 102. More specifically, upon receiving a control packet over the transport ring 102, a transport node will check the destination node identifier (receiver address) stored in a predetermined field of the control packet. If the destination node identifier corresponds to that particular transport node, the control packet will then be checked for a congestion stamp. Upon detection of such a stamp, the source node identifier (sender address) will be read from the control packet and the congestion stamp transmitted back to the sender using an outgoing control packet traveling in the direction of the sender.

Note that the receiver is a node that is the intended recipient of the user data packet associated with the control packet. In that sense the receiver is different from the intermediate nodes since it generates an acknowledgement for the user data packet (the outgoing control packet mentioned above) to signal to the sender that the information has been correctly received. Such acknowledgement provides a convenient mechanism to transfer back to the sender the congestion stamp acquired by the control packet during its transit through one or more intermediate nodes. Thus, when the sender of the control packet receives the acknowledgment (control packet issued by the receiver), it is notified that congestion exists or is developing in the network. In response to this congestion stamp, the sender can reduce its rate of release of traffic units into the network in order to reduce the congestion.

Typically only a small percentage of the control packets are marked with congestion stamps. This isolation between the control information and the actual data stream accommodates implementations such as optical networks where the data control system can be run on a low speed system while the real data can exploit high speed, fixed-length parallel transfers. Other implementations provided for include packet-based systems with variable length packets. The size of the data packet can be freely chosen as long as it allows for control information (control packets) to be received often enough to suit the goal of the control loop (i.e. the round trip control loop timing of the system). Note that configuring different data packet sizes for different trunks is one way to bias the sharing of available bandwidth between the trunks.

When the sender 104 receives a control packet marked with a congestion stamp from the receiver 112, it will reduce the size of the TCP-like adaptive window, thus reducing its data-sending rate. The sender 104 is aware of the round trip control time for the trunk and need only react to one congestion stamp in that time period. In a preferred embodiment of the present invention, the adaptive window control algorithm implemented by the transport ring nodes is based on the above-described TCP model of multiplicative decrease and additive increase. Specifically, the sender 104 will progressively increase its data-sending rate until a congestion stamp is received, at which point it will reduce its data sending rate. In the absence of further congestion stamps, the sender 104 will again start progressively increasing its data-sending rate. This algorithm will not be described in further detail, as it is well documented and well known to those skilled in the art. It should be noted that there are many alternative algorithms for use in implementing the adaptive window control algorithm, also included within the scope of the present invention.

In a specific example of implementation, the transport ring 102 is a slotted ring, wherein each slot on the ring 102 represents a user data packet. Generally, a slotted ring's data control system involves the use of an information "header", travelling in parallel with the user data packet and carrying basic information such as whether the slot is in use and, if in use, the destination node (receiver) to which it is being sent. This header may also carry the control packet that can be marked at any node to indicate congestion.

Figure 3:
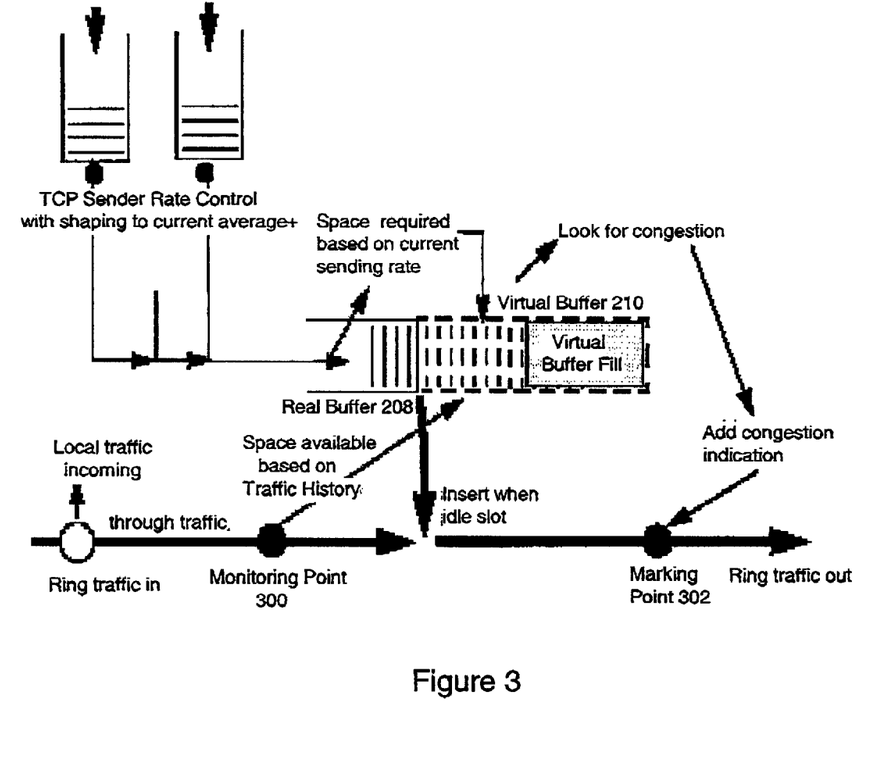
FIG. 3 is a functional block diagram of the transport node shown in FIG. 2.

As it was generally discussed earlier, the control unit 200 of a node assesses congestion by first determining the data occupancy level of the transport ring 102. This data occupancy level is then compared to a threshold level, where the threshold level is dynamic and varies on the basis of the rate of release of data packets from the real buffer 208 (local sending rate). FIG. 3 is a functional illustration of the transport node 104, specifically intended to depict how the data occupancy level is established and how congestion is forecasted. The control unit 200 checks the incoming information headers at a monitoring point 300 and, for each slot, updates a history of slot status maintained in memory 204. The history of slot status maintained in memory 204 includes the number of busy slots passing the monitoring point as well as the number of available slots passing the monitoring point, where these variables are reset upon the expiration of one round trip time of the transport ring 102. When updating the history in memory 204, the control unit 200 treats each idle or previously marked slot as available and all others as busy. Note that a marked slot will result in at least one available slot in the next period. Thus, this history reveals the data occupancy level of the transport ring 102, that is the amount of data being carried by the transport ring 102. The number of available slots occurring in a period equal to one round trip time for the ring is used to produce an effective "fill" of the virtual buffer 210 in memory 204, where having no available slots is equivalent to having 100% fill.

If the virtual buffer 210 fill is below the threshold level, such that the number of available slots on the transport ring 102 is adequate to handle all the traffic that the node 104 wants to send in that period, then there is no congestion. If the number is not adequate, and the fill is above the threshold level, then congestion notification must be invoked, by marking an outgoing control packet with a congestion stamp at a marking point 302. Note that the available slot requirement for transport node 104, that is the threshold level, is based on the current sending rate of the node 104, or on a future projection of this sending rate. The earlier described adaptive window control algorithm ensures that the TCP-like adaptive window growth is very gentle so that the number of available slots seen during one round trip time of the transport ring 102 can be used to project the number available in the next round trip time.

The threshold level is dynamic in that it reflects the amount of local data that the node is desirous of inputting to the network. The more local data there is to be released by the node 104 to the transport ring 102, the lesser the data occupancy level needed to trigger the congestion control mechanism. Consequently, the threshold level decreases with an increased amount of local data for release by the node 104 to the transport ring 102.

While implemented separately from the above-described congestion assessment operation, it should be noted that if an information header is indicative of an idle slot, the control unit 200 generates and inserts a control packet into the information header for transmission over the transport ring 102. In addition, a data packet from the real buffer 108 is inserted into the corresponding parallel idle slot for transmission over the transport ring 102.

Figure 4:
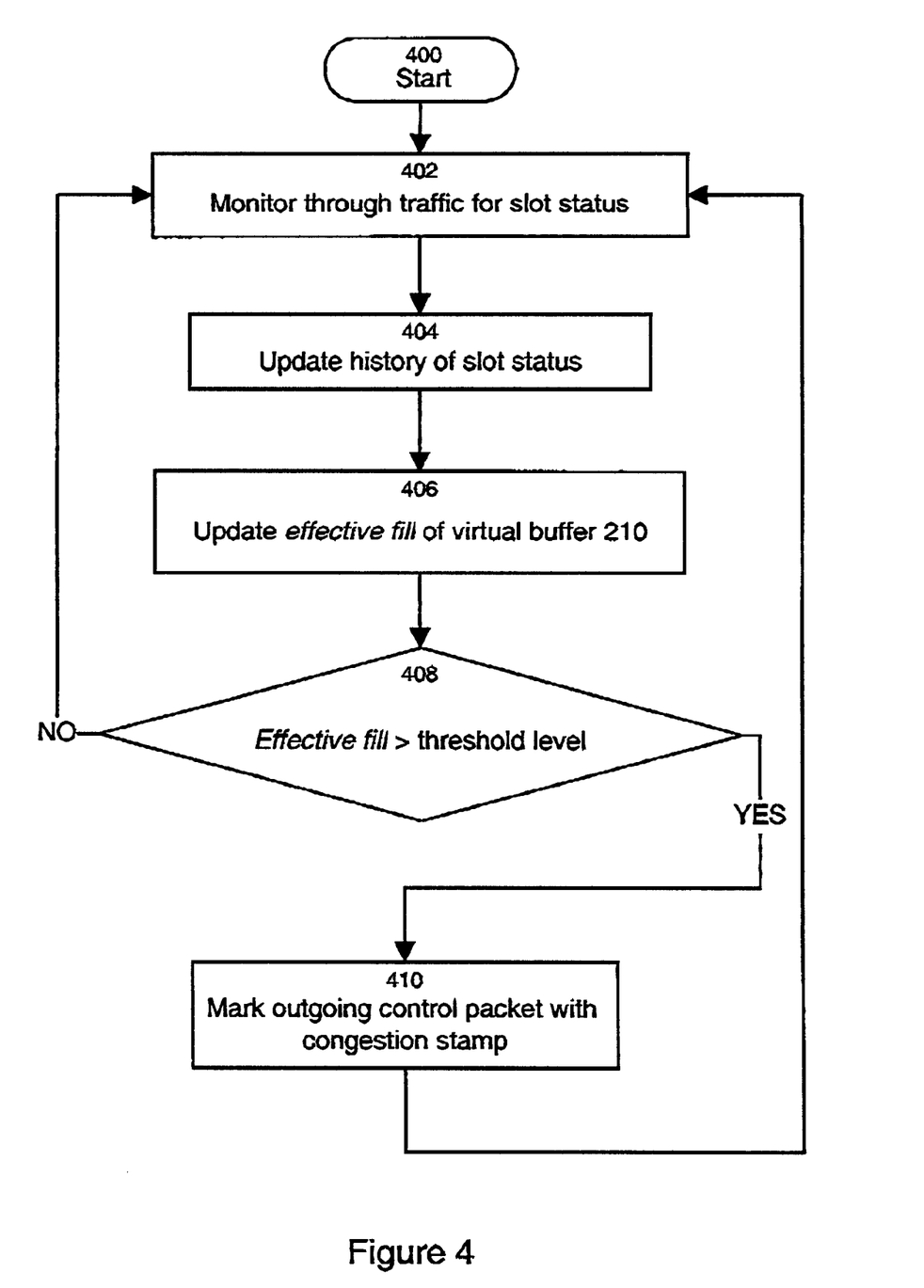
FIG. 4 is a flowchart illustrating the operation of a program element in the transport node depicted in FIG. 2, which implements the congestion assessment and operation of the transport node.

FIG. 4 provides a complete flowchart illustrating an example of the operation of the program element stored in the memory 204 of the control unit 200, and executed by the processor 206, that regulates the congestion control mechanism of the transport node 104. At step 402, the control unit 200 monitors the information headers (control traffic) passing through transport node 104. For each information header, the control unit 200 checks to see if the header is marked as being idle or not and updates the history maintained in memory 204 accordingly, at step 404. Based on this history, the number of slots available in a period equal to one round trip time of the ring 102 is determined and the effective fill of virtual buffer 210 is updated at step 406. At step 408, the control unit 200 assesses its congestion situation, using the fill of virtual buffer 210 (data occupancy level) and the threshold level, itself based on the current data sending rate of the transport node 104. If the space required on the transport ring 102 based on the current data sending rate is greater than the available space on the transport ring 102, such that the effective fill of virtual buffer 210 is above the threshold level, an outgoing control packet is marked with a congestion stamp at step 410.

Figure 5:
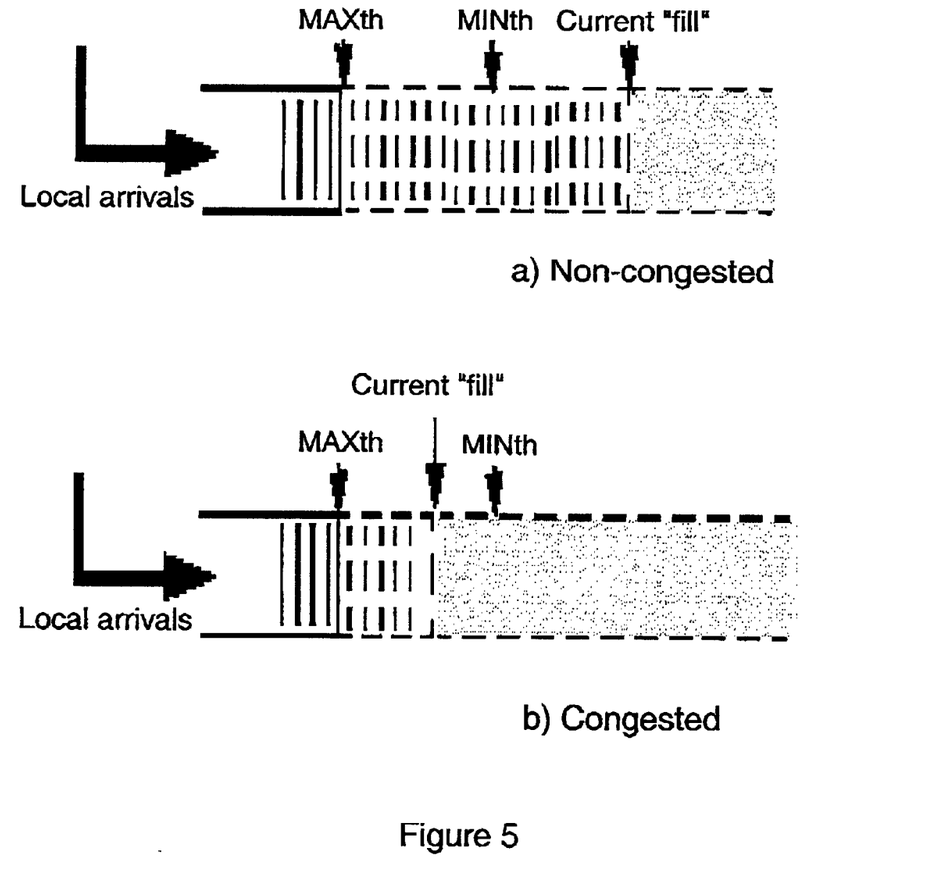
FIG. 5 illustrates a mechanism for forecasting congestion, in accordance with an embodiment of the present invention.

In order to ensure that the transport ring 102 is operated at close to 100% usage for maximum efficiency, a mechanism may be used to gradually increase the congestion marking probability, such as is used in Random Early Detection (RED). In a particular embodiment, the 100% fill of virtual buffer 210 is equated to the maximum threshold of RED (MAXth), while the minim threshold (MINth) is calculated by subtracting the projected local requirement from MAXth, as shown in FIG. 5. Also, as in RED, the buffer fill can be calculated as a weighted average over several round trip times. Since RED is well documented and known to those skilled in the art, it will not be described in further detail.

Taking for example the slotted ring, the control loop round trip time is identical for all transport nodes and bandwidth sharing between nodes is generally quite fair. In other add/drop networks, some correction factors may be required to ensure fair sharing or, as suggested earlier, to deliberately bias sharing toward particular trunks. The sharing properties may be biased by adjusting round trip times or by allocating some trunks larger data units. In a particular example of a slotted ring network, the sender node for a particular trunk could be allowed to insert non-modifiable control packets with the basic data packets. If one normal control packet is sent for every three non-modifiable control packets then the trunk has an effective data packet of four times the basic data packet, thus providing the trunk with a greater share of the bandwidth over the transport medium.

In an alternative embodiment, the above-described control overlay concept and use of a virtual buffer to perform congestion assessment at a transport node may be implemented within a standard routed network. Specifically, at each network router congestion may be foreseen and reduced without causing network latency due to data buffering. Rather than buffering all data flowing through the network and using the buffer fill to trigger packet loss, the virtual buffer having a fill representative of the transport medium data occupancy level may be used to implement the congestion control mechanism. Further, the transport medium data occupancy level may be determined by monitoring the control system, itself decoupled from the data transport system.

The above description of a preferred embodiment under the present invention should not be read in a limitative manner as refinements and variations are possible without departing from the spirit of the invention. The scope of the invention is defined in the appended claims and their equivalents.

We claim:

1. A node for use in a data network, said node comprising;
   an input for receiving traffic units from a first remote node;
   an output for releasing traffic units to a second remote node;
   a control unit coupled to said input for estimating a data occupancy level of at least a portion of the data network based at least on a rate of traffic units passing from said input to said output, when the data occupancy level reaches a certain threshold said control unit being operative to generate a control signal instrumental to cause a reduction in the data occupancy level.

2. A node as defined in claim 1, wherein said traffic units are selected from the group consisting of user data packets, control packets and compound packets including a user data part and a control part.

3. A node as defined in claim 2, wherein said control signal is directed to a remote node issuing traffic units towards said input.

4. A node as defined in claim 3, wherein said input is a first input, said node further comprising a second input for receiving traffic units from a local source for transmission to a remote node in the network.

5. A node as defined in claim 4, wherein said certain threshold is dynamic and varies on the basis of the rate of release from said node of the traffic units received at said second input.

6. A node as defined in claim 5, wherein said traffic units received from a local source for transmission to a remote node in the network are user data packets.

7. A node as defined in claim 5, wherein said control signal includes a congestion stamp placed into a certain traffic unit released from said output.

8. A node as defined in claim 7, wherein said certain traffic unit includes a source identifier and a destination identifier, the destination identifier designating a downstream remote node of the network, the source identifier designating an upstream remote node of the network, upon reception of the certain traffic unit at the downstream remote node said congestion stamp being transmitted to the upstream remote node.

9. A node as defined in claim 8, wherein said control unit is responsive to a congestion stamp received from a remote node in the network and associated to a user data packet originating from said node to reduce a rate of release from said node of the traffic units received at said second input.

10. A node as defined in claim 9, wherein said control unit is operative to progressively increase a rate of release from said node of the traffic units received at said second input until a congestion stamp is received from a remote node in the network.

11. A node as defined in claim 10, wherein each of said traffic units received at said first input is either one of a user data packet and a control packet, the control packets being associated with respective user data packets and being transmitted separately from the user data packets in the network.

12. A node as defined in claim 11, wherein said control unit estimates a data occupancy level of at least a portion of the data network based at least on a rate of control packets passing from said first input to said output.

13. A node as defined in claim 9, wherein the congestion stamp is carried by a control packet received from a remote node in the network.

14. A method for controlling congestion at a node in a data network, said node comprising:
   a input for receiving traffic units from a first remote node;
   an output for releasing traffic units to a second remote node;
   said method comprising:
      a) estimating a data occupancy level of at least a portion of the data network based at least on a rate of traffic units passing from said input to said output;
      b) when the data occupancy level reaches a certain threshold generating a control signal instrumental to cause a reduction in the data occupancy level.

15. A method as defined in claim 14, wherein said traffic units are selected from the group consisting of user data packets, control packets and compound packets including a data part and a control part.

16. A method as defined in claim 15, wherein said control signal is directed to a remote node issuing traffic units towards said input.

17. A method as defined in claim 16, wherein said input is a first input, said node further comprising a second input for receiving traffic units from a local source for transmission to a remote node in the data network.

18. A method as defined in claim 17, wherein said certain threshold is dynamic, said method comprising varying said threshold on a basis of a rate of release from said node of traffic units received at said second input.

19. A method as defined in claim 17, wherein the traffic units received at said second input are user data packets.

20. A method as defined in claim 17, wherein the control signal includes a congestion stamp placed into a certain traffic unit released from said output.

21. A method as defined in claim 20, wherein said certain traffic unit includes a source identifier and a destination identifier, the destination identifier designating a downstream remote node of the network, the source identifier designating an upstream remote node of the network, upon reception of the certain traffic unit at the downstream remote node the congestion stamp being transmitted to the upstream remote node.

22. A method as defined in claim 21, said method comprising reducing a rate of release from said node of the traffic units received at said second input in response to a congestion stamp received from a remote node in the network.

23. A method as defined in claim 22, said method comprising progressively increasing a rate of release from said node of the traffic units received at said second input until a congestion stamp is received from a remote node in the network.

24. A node for use in a data network, said node comprising:
   input means for receiving traffic units from a first remote node;
   output means for releasing traffic units to a second remote node;
   control means coupled to said input means for estimating a data occupancy level of at least a portion of the data network based at least on a rate of traffic units passing from said input means to said output means, when the data occupancy level reaches a certain threshold said control means being operative to generate a control signal to cause a reduction in the data occupancy level.

* * * * *